Patented Apr. 10, 1951

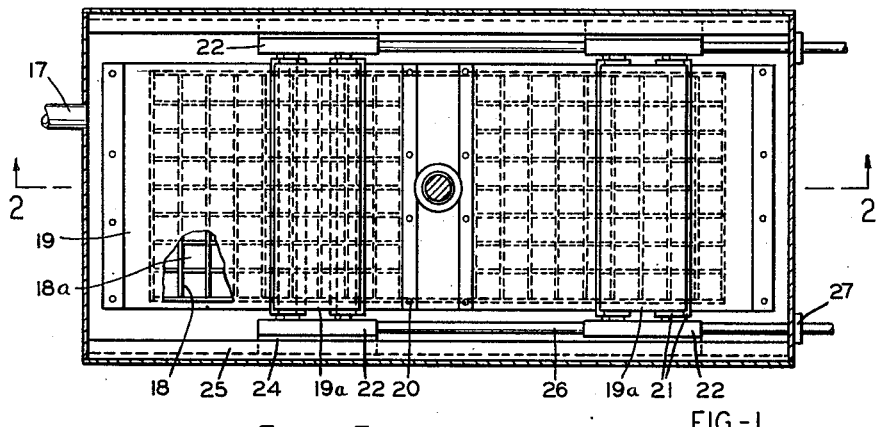
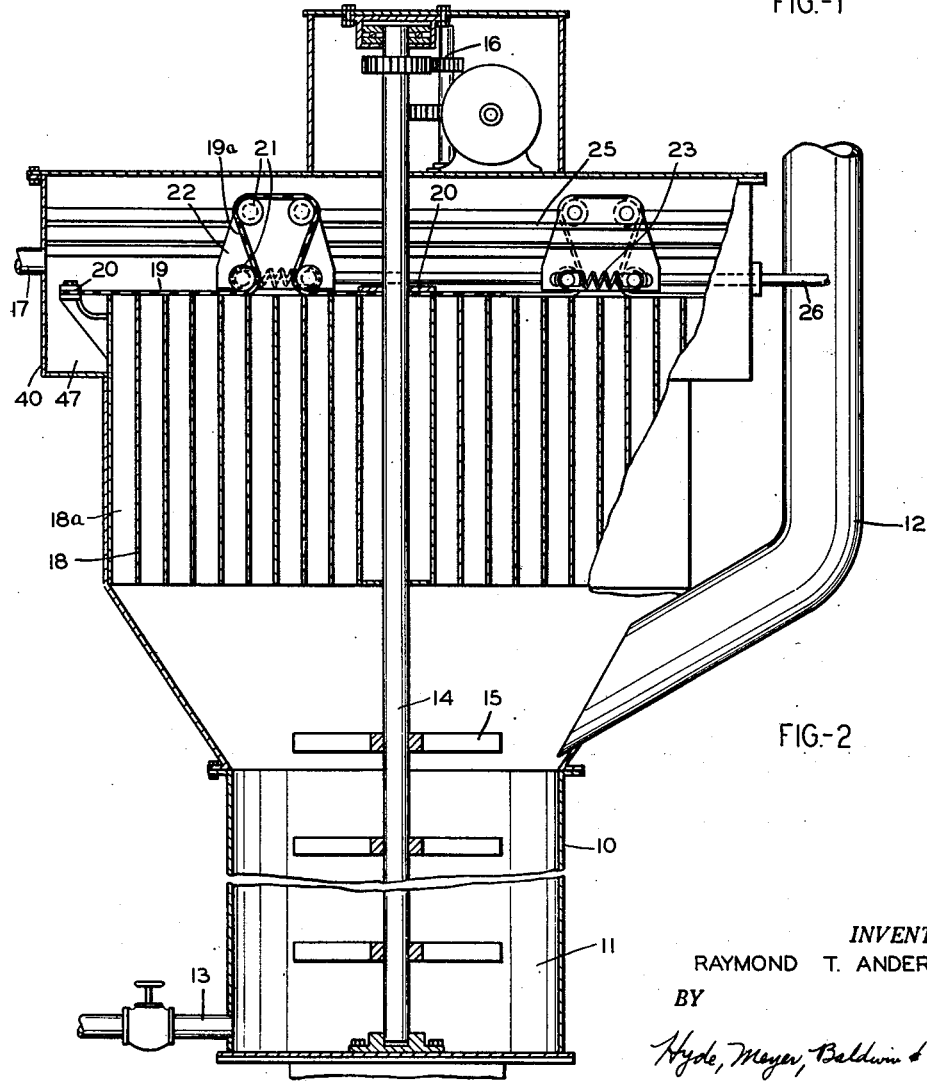

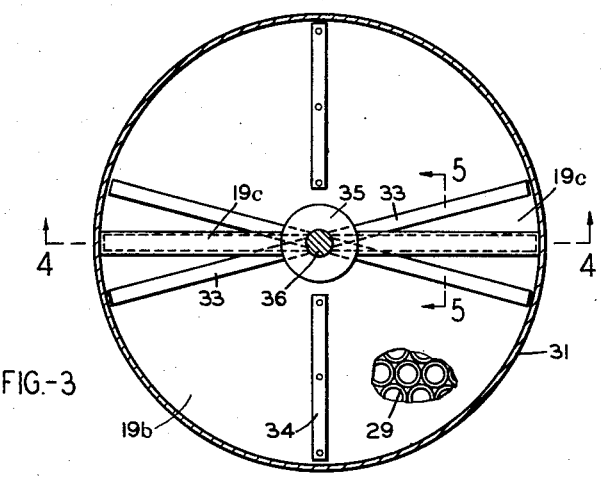
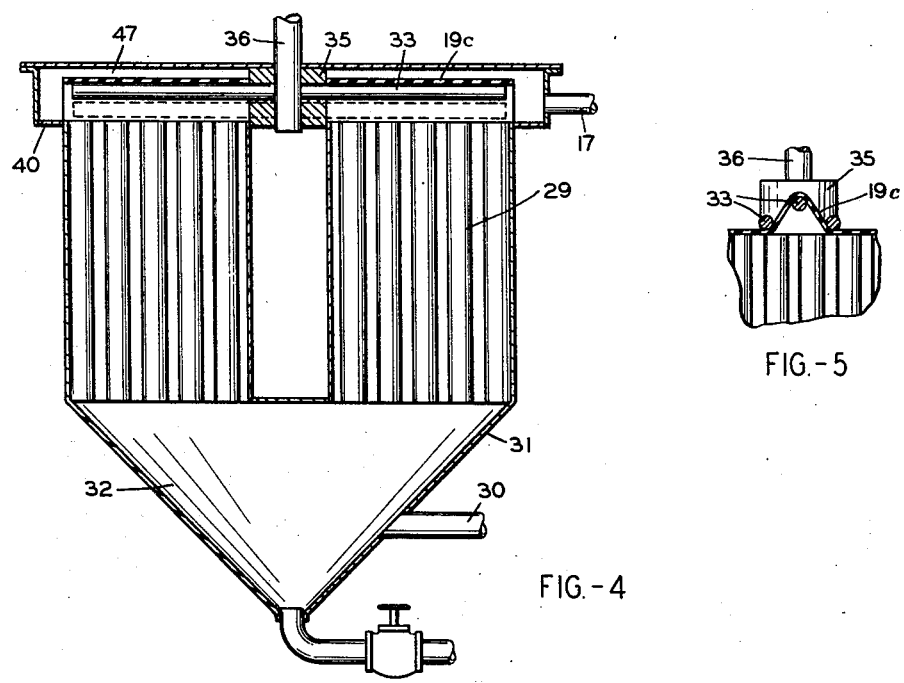

2,548,333

UNITED STATES PATENT OFFICE 2,548,333

FINES SEPARATOR FOR SOLVENT EXTRACTION SYSTEMS

Raymond T. Anderson, Lakewood, Ohio, assignor to The V. D. Anderson Company, Cleveland, Ohio, a corporation of Ohio Application April 27, 1949, Serial No. 89,921

5 Claims. (Cl. 210—57)

This invention relates to the separation of fine solid material from miscella collected as the result of extraction of oil or fat from solid proteinaceous material, such as seeds, nuts, animal matter, or the like, with a solvent liquid, such as hexane. The invention has more particular relation to that type of solvent extraction system in which the miscella produced in the extraction tower is caused or permitted to rise through a large number of parallel vertical channels, flow being permitted in only a small number thereof at any one time, so that the liquid in each channel is quiescent during fairly long periods sufficient to permit the fines therein to settle back to the supply chamber for recovery or collection with other solids.

One object of the invention is to provide improved valve mechanism for controlling the flow through the several channels, and more particularly a valve mechanism which is of simple form, easy to construct and install, and which provides tight seal and avoids leakage, but without resort to impractical or expensive machine operations.

Another object is to provide improved valve mechanism for the purpose described, including a flexible vane or diaphragm cooperating with a large number of ports or openings, together with means for so manipulating the diaphragm as to open or close the ports, a few at a time, in regular recurrent order.

Still another object is to provide an improved fines separator for use in a solvent extraction plant, in which a flexible valve diaphragm large enough to cover simultaneously a large number of ports or openings is operated in such manner as to open them in turn for brief periods of flow therethrough but at other times and for longer periods cutting off the flow to permit settling of the fines in the channels to which the ports are open.

Further objects of the invention in part are obvious and in part will appear more in detail hereinafter.

In the drawings, Fig. 1 is a plan view of one form of apparatus embodying the invention;

Fig. 2 is a sectional elevation thereof, on the line 2—2, Fig. 1;

Fig. 3 is a plan view of another arrangement;

Fig. 4 is a section thereof on the line 4—4, Fig. 3;

Fig. 5 is a detail cross section on the line 5—5, Fig. 3;

Figure 6:
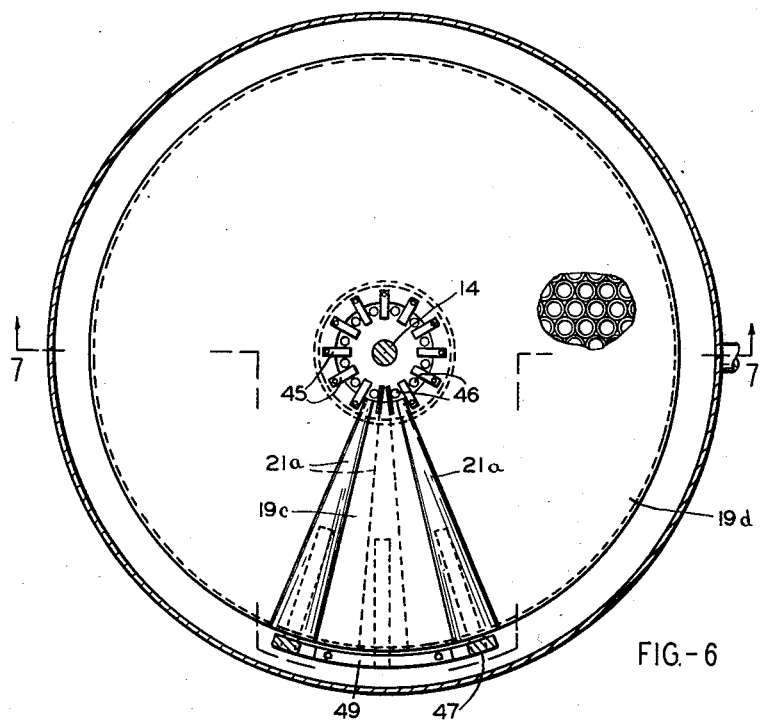
Fig. 6 is a plan view, showing another arrangement.

In Figs. 1 and 2, the fines separator forming the subject matter of the present invention is organized with or as a part of a solvent extraction tower, after the manner of that shown in either of two prior applications, one by Louis F. Langhurst, Serial No. 700,022, filed September 28, 1946, now Patent Number 2,441,200, May 11, 1948, for Method and Apparatus for Separating Finely Divided Solid Material from a Fluid Suspension Thereof, and the other by Smith and Weigel, Serial No. 8,086, filed February 13, 1948, for Fines Separation, to which reference may be had if desirable or necessary. But such an organization is not essential, as will later appear.

As shown, the apparatus includes a tall cylindrical tower 10 having an extraction chamber 11 provided with a supply conduit 12 for the solid material to be extracted, such as soy beans, flax seed, cotton seed, or the like, a valved inlet 13 for the solvent liquid, such as hexane, and suitable means (not shown) for withdrawing the extracted solid material. Within the tower rotates slowly a vertical shaft 14 provided with stirring or agitating arms 15 and operated by suitable driving mechanism 16 located at either its upper or its lower end. The solid material descends slowly and is continuously withdrawn in any suitable manner, from the bottom of the tower, while the liquid rises through the solid, extracts the oil therefrom, and is continuously withdrawn, as miscella, from an upper overflow discharge spout 17.

During its upward flow, the miscella traverses, in parallel, a large number (several hundred) of channels or passages, such as those within and between a number of cross walls 18, spaced an inch or two apart, the channels 18a therein being open at their lower ends, where they communicate with the extraction or miscella supply chamber 11, and at their upper ends being provided with means for controlling the flow through them. The arrangement is such that flow is permitted through only a few, five, ten or so, at a time, each channel or group of channels taking its turn in order. Thus, through each channel flow is permitted during only a short period, say two to five minutes, during each hour. During the remaining time the liquid in the channel is quiescent with full opportunity for fine solid material to settle and mingle with that in the extracting chamber 11. The channels may be those within and around a bundle of pipes or tubes, as will later appear.

The valve mechanism for so controlling flow is as follows:

The channels in Fig. 1 are grouped in two or more sets distributed symmetrically in rectangular box form about the central vertical axis. The upper ends of the walls which form them are cut off square and lie in the same general horizontal plane. Upon them is laid a flexible strong fairly heavy vane or diaphragm 19, made of any suitable material unaffected by the hexane or other solvent, such as rubber or a rubberlike or plastic material, e. g., neoprene. The channels of each group are arranged in rectangular form and the curtain, along its inner and outer edges, is fastened down to a suitable support, as at 20. Diaphragm 19 is larger in area than the total end area of the group of channels with which it cooperates, including enough extra material to provide a pleat, fold or convolution 19a which is trained to run over several parallel rollers 21, four being shown, two upper and two lower, mounted in a reciprocable frame 22, the two lower rollers being biased toward each other by tension springs 23. Frame 22 is provided with end projections 24 which travel back and forth along side guides 25 and is actuated by power reciprocation of a rod or rods 26 extending through packings 27 to the outside of the casing.

The two frames 22, one on each side of the center, may be connected by the rods 26, so that both may be reciprocated by the same mechanism.

Lower rollers 21 are spaced apart, as shown in Fig. 2. Thus, between them is a long narrow area where the ends of the channels 18a are open and exposed, so that flow through them is permitted at a rate depending upon their combined cross sectional area and the rate of supply of liquid. Adjustment of the flow producing pump (not shown) and proportioning of the parts are such that the rate of upward flow of liquid is always less than the rate of settling of fine solid particles in the solvent liquid. Therefore, in the uncovered or open channels settling goes on slowly, with clean solid free liquid discharging at the top and solid particles settling to the bottom.

All other channels are closed at their upper ends by the flexible vane or diaphragm, which not only is heavy enough to keep the channels closed by its own weight, but also is held down by the tension of springs 23. Settling occurs in these closed channels without any contrary effect of rising liquid.

Carriage 24 is reciprocated very slowly, its motion causing the elevated fold or convolution 19a of the diaphragm to travel back and forth, with wave-like motion, across the open ends of the channels. Thus, each channel in turn is opened very gradually and without any pumping tendency. There is no sharp sudden break, as when cracking the ordinary valve under pressure. No particular force is necessary, only enough to overcome friction losses and to flex the diaphragm, requiring but little power. At the same time, all leakage is avoided when the channels are closed.

Figs. 3 and 4 show another arrangement in which the channels are formed by tubes 29, bundled in a generally cylindrical group distributed uniformly about a central axis, an arrangement which lends itself nicely to use at the upper end of an extraction tower provided with a central agitating shaft, as in Fig. 1. However, in this form the fines separator is not built into the same structure as the extraction tower, but is separate therefrom. The miscella is conducted from the extracting tower by a pipe or conduit 30 to a reservoir 31 having a conical supply chamber 32. The upper part of this reservoir is cylindrical and serves to house the fines separating tubes or pipes 29, the upper ends of which are closed or opened by a vane or diaphragm 19b which in this case is generally circular or of washer like form. Said diaphragm includes extra material or fullness, enough to form one or more radially extending folds or convolutions 19c, each of which is supported by the rods of a radially extending carriage 33 mounted to revolve bodily back and forth about the central axis and operated in any suitable manner. Both the inner and outer circular edges of the diaphragm are free or unattached, but it is held in place by radial bars 34 (two being shown) bolted in place. Each carriage 33 may be of three rod or prong form mounted upon a ring 35 turning with or upon a central shaft 36, although other arrangements are suitable for the purpose.

In this form, carriage 33 is slowly turned around the central axis, first clockwise, then counterclockwise, carrying with it the extra material of the diaphragm in wrinkle or convolution form as it proceeds, and thus opening only a few of the channels at any one time, but all of them in order, as in the form first described.

In both forms so far described, the tower includes a peripherally extending housing 40 enclosing a chamber 41 surrounding the top of the separator just above the flexible diaphragm 19 or 19b. This chamber communicates with the overflow discharge pipe 17, and provides clearance for outward flow to said pipe of the liquid from which the fines have been separated.

Either form of fines separator shown may be used either as a part of or at the upper end of the extraction tower, as shown in Figs. 1 and 2, or in connection with a separate reservoir to which the miscella is conducted from the extraction tower, as in Figs. 3 and 4.

Figure 7:
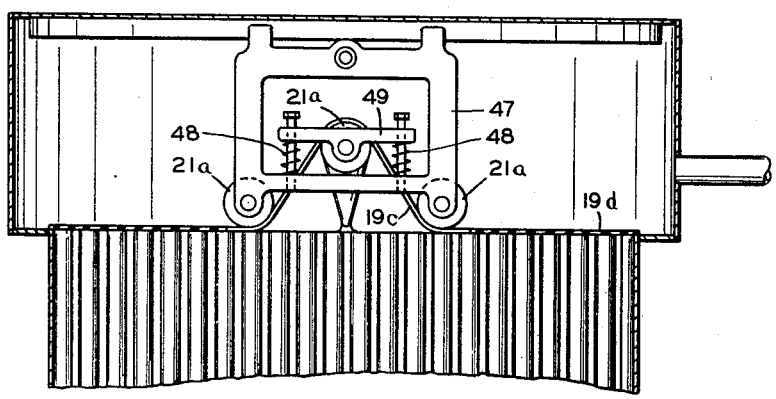
Fig. 7 is a sectional elevation on the line 7—7, Fig. 6.

Figs. 6 and 7 show still another arrangement in which the vane or diaphragm, here marked 19d, is generally circular, as before, but the carriage and rollers travel around the central axis continuously in one direction, and do not reciprocate.

The diaphragm has a central opening through which the vertical drive shaft 14 extends and along the edge of said opening is provided with a series of metal tongues or fingers 45, spaced apart, each lying between two of a series of upstanding vertical pins 46 mounted on the stationary metal frame. There is one more finger than there are pins. This extra finger extends inwardly from the loop or convolution of vane 19c, which is trained around three conical rollers 21a rotatable in and carried by carriage 47. This travels along suitable guides in the casing wall and is slowly advanced around the central axis by a rod connection (not shown) to the slowly rotating shaft 14. Compression springs 48 apply tension to the apron by upward thrust on a movable member 49 which supports the upper roller.

Here, as the carriage travels around the loop or fold in the vane travels with it. The fold extends clear to the central opening in the vane, including the material to which the small fingers are attached. Thus, successively, these small fingers, rise and fall, in each case advancing over one of the pins 46 to the next space between pins. The apron as a whole therefore creeps, as it were, around the central axis, one step at each complete revolution of shaft 14.

As a valve, operation of this vane is the same as those before described.

In all forms, the controlling valve mechanism is of simple form, may be made and applied at low cost and is not likely to get out of order in service. No close machine work or fitting is necessary and yet leakage and turbulence are avoided.

Other advantages of the invention will be apparent to those skilled in the art.

What I claim is:

1. Apparatus for separating fine solid particles from a solid carrying fluid, comprising a separating chamber provided with means subdividing it into a relatively large number of upright parallel channels extending from a supply reservoir at one end of the chamber to a discharge space at its other end, said channels all terminating in openings lying in a common transverse plane, means for supplying solid-carrying fluid to the supply reservoir, means for withdrawing clarified fluid from the discharge space, a flexible transversely extending imperforate diaphragm overlying said plane, diaphragm manipulating means movably mounted adjacent said plane and having a supporting part above said plane, said diaphragm having an upwardly arched portion extending over and in slidable contact with said supporting part whereby to open the channels beneath said arched portion, the remainder of said diaphragm on each side of the base of said arched portion lying in said plane whereby to close the channels which terminate thereunder, operating means for moving said manipulating means along and adjacent said plane relatively to said diaphragm and relatively to said channels whereby to cause movement of said supporting part along and under said diaphragm to progressively raise successive portions of said diaphragm and to open and close successively adjacent channels along the direction of movement, so that in each channel there are periods during which fluid flow occurs alternating with periods during which the fluid is quiescent and fine solid particles separate and return to the supply reservoir.

2. Apparatus as defined in claim 1 wherein means is provided for arranging said channels in a plurality of groups, each such group having its respective overlying diaphragm, each such group also having its respective diaphragm manipulating means and diaphragm supporting part, and a single operating means having actuating connections with all said manipulating means whereby the arched portions of said diaphragms are simultaneously movable by operation of said single operating means.

3. Apparatus as defined in claim 1 wherein said separating chamber is of rectangular horizontal cross-sectional contour, said diaphragm being likewise of rectangular contour, said diaphragm supporting means extending completely across one lateral dimension of said diaphragm, and wherein said diaphragm manipulating means is reciprocatable along said diaphragm at right angles to the said lateral dimension whereby to cause said arched portion to likewise reciprocate back and forth in the direction of movement of said manipulating means.

4. Apparatus as defined in claim 1 wherein the subdividing means defines a group of channels, the peripheral contour of said group being generally cylindrical, so that the upper termini of said channels is in a generally circular plane, said diaphragm being of generally circular contour to overlie said plane but having excess material to allow for the formation of an arched portion above said plane, centrally disposed, fixed means from which said diaphragm supporting part extends radially outwardly under said arched portion, and wherein said operating means causes said diaphragm supporting part to swing in radius-vector fashion around said fixed means as a center whereby to cause said arched portion to likewise swing with said supporting part and successively open the channels beneath said arched portion.

5. Apparatus as defined in claim 4 wherein the group of channels is subdivided into two sub-groups, and wherein two diaphragms are provided, each of semicircular contour, and each overlying a respective sub-group, each diaphragm having a respective diaphragm supporting part extending radially outwardly from said fixed means, and each diaphragm having a respective arched portion extending over its supporting part, whereby said diaphragms are simultaneously movable by operation of said supporting parts.

RAYMOND T. ANDERSON.

REFERENCES CITED

The following references are of record in the file of this patent:

UNITED STATES PATENTS

| Number | Name | Date |
| --- | --- | --- |
| 1,176,774 | Morris | Mar. 28, 1916 |
| 1,359,162 | Genter | Nov. 16, 1920 |
| 1,708,021 | Lenz et al. | Apr. 9, 1929 |
| 1,943,367 | Champion | Jan. 16, 1934 |
| 2,069,024 | Vohmann et al. | Jan. 26, 1937 |
| 2,441,200 | Langhurst | May 11, 1948 |

FOREIGN PATENTS

| Number | Country | Date |
| --- | --- | --- |
| 513,308 | Great Britain | Dec. 28, 1927 |
| 554,683 | Great Britain | July 15, 1943 |